United States Patent
Wu et al.

(10) Patent No.: US 7,948,842 B2
(45) Date of Patent: *May 24, 2011

(54) RANDOM ACCESS CONTROL METHOD AND OPTICAL DISC DRIVER

(75) Inventors: Tse-Hong Wu, Hsinchu (TW);
Shih-Hsin Chen, Hsinchu County (TW);
Shih-Ta Hung, Taoyuan County (TW);
KuanYu Lai, Changhua County (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/773,192

(22) Filed: May 4, 2010

(65) Prior Publication Data

US 2010/0214888 A1 Aug. 26, 2010

Related U.S. Application Data

(63) Continuation of application No. 12/032,724, filed on Feb. 18, 2008, now Pat. No. 7,738,329.

(60) Provisional application No. 60/890,207, filed on Feb. 16, 2007.

(51) Int. Cl.
*G11B 7/00* (2006.01)
*G11B 5/09* (2006.01)

(52) U.S. Cl. ............. 369/44.39; 369/47.1; 369/53.2
(58) Field of Classification Search .......... 369/47.1, 369/53.2, 47.14, 59.25, 44.39; 711/112, 711/135, 113, 118
See application file for complete search history.

(56) References Cited

U.S. PATENT DOCUMENTS

| | | |
|---|---|---|
| 5,841,600 A | 11/1998 | Kaplan |
| 6,480,936 B1 * | 11/2002 | Ban et al. .......... 711/118 |
| 7,050,369 B2 | 5/2006 | Lee et al. |
| 7,551,530 B2 * | 6/2009 | Yamamoto et al. ....... 369/47.1 |
| 2008/0198706 A1 * | 8/2008 | Wu et al. .............. 369/30.23 |

* cited by examiner

*Primary Examiner* — Ali Neyzari
(74) *Attorney, Agent, or Firm* — Thomas|Kayden

(57) ABSTRACT

A random access control method is provided, implemented in an optical disc drive for recording data to an optical disc. In the optical disc drive, a buffer stores a plurality of write commands each associated with a data block bound to a destination address. A processor controls the buffer to build a disc write task from the write commands in which addresses are organized in order. A drive unit is controlled by the processor, performing a recording operation to record the data blocks to the optical disc according to the disc write task; wherein the processor further controls the drive unit to verify the recorded data blocks after completing the recording operation.

11 Claims, 4 Drawing Sheets

RANDOM ACCESS CONTROL METHOD AND OPTICAL DISC DRIVER

CROSS REFERENCE TO RELATED APPLICATIONS

This application is a continuation of U.S. patent application Ser. No. 12/032,724, filed Feb. 18, 2008, which claims the benefit of U.S. Provisional Application No. 60/890,207 filed on Feb. 16, 2007, the entirety of which are incorporated by reference herein.

BACKGROUND OF THE INVENTION

1. Field of the Invention

The invention relates to random access optical discs, and in particular, to an efficient method for data recording and data verification of an optical disc.

2. Description of the Related Art

FIG. 1 is a simplified block diagram showing an optical disc drive 120 coupled to a host 110. The optical disc drive 120 performs random read and recording operations on an optical disc such as a Blue-Ray rewritable disc, a DVD-RAM disc or other rewritable discs (not shown). To record data, the host 110 may issue write commands $\#W_c$ designated to record one or more data blocks $\#W_D$ into corresponding destination addresses of the optical disc. The optical disc drive 120 typically comprises a processor 122, a buffer 124 and a drive unit 126. The drive unit 126 comprises a mechanical unit including a rotation motor, a pickup head and servo control loop circuits (not shown) for physical access of the optical disc. The buffer 124 is a memory device buffering input and output data passing between the host 110 and drive unit 126. The processor 122 is a processing unit providing control of the optical disc drive 120 according to preinstalled firmware (not shown), and manages the buffer 124. The architecture is common for those skilled in the art, as such detailed description is not given herein.

FIG. 2 is a flowchart of a conventional random access control method. Random access of optical discs is a basic function, comparing to conventional sequential access, whereby various requests may be randomly issued by the host 110 to elastically access the optical disc, such as reading, recording, and erasure of one or more data blocks. Conventionally, a recording operation is followed by a verification operation. In step 202, the optical disc drive 120 enters a waiting loop to await any commands delivered from the host 110. In step 204, the optical disc drive 120 receives a write command $\#W_c$ requesting to record a data block $\#W_D$ to a destination address on the optical disc. The associated data block $\#W_D$ may also be provided by the host 110 and buffered in the buffer 124. In step 206, the processor 122 instructs the drive unit 126 to perform a track seeking operation, moving the pickup head on to the destination address. In step 208, upon pickup head arrival at the destination address, the data block $\#W_D$ buffered in the buffer 124 is converted into a radiation form and recorded onto the optical disc by the drive unit 126. In step 210, the recorded data block $\#W_D$ on the destination address is further verified to ensure data integrity. A conventional data verification process may comprise of consecutive mechanical operations. For example, to verify the recorded data block $\#W_D$, a reading process may be required over the same destination address. To accomplish the reading process, another track seeking step may also be required. Error detection and correction such as Reed Solomon ECC algorithm may be performed on the readouts. Besides ECC correction, the readouts may also be compared with the original data block $\#W_D$ stored in the buffer 124 to determine their identity. In step 212, the verification result is output, indicating whether an erroneous recorded data block $\#W_D$ is found. If so, an error handling procedure is triggered in step 214, requesting a rerecording process, a correction process or else. Otherwise, the process returns to step 202, entering the waiting loop to await any other commands.

Conventionally, a track seeking process needs a time consuming mechanical movement involving motion of pickup heads and servo controls. The steps in FIG. 2 form a subroutine cycle triggered every time a write command $\#W_c$ is issued, in which at least one track seeking and data verification is required per cycle. When a number of random write/read commands are issued, each bound to various addresses without order and continuity, the optical disc drive performance will significantly decrease due to the inefficiency of track seeking. Thus, an enhanced method to reduce unnecessary track seeking is desirable.

BRIEF SUMMARY OF THE INVENTION

An exemplary embodiment of a random access control method is provided, implemented in an optical disc drive for recording data to an optical disc. In the optical disc drive, a buffer stores a plurality of write commands each associated with a data block bound to a destination address. A processor controls the buffer to build a disc write task from the write commands in which addresses of data blocks are organized in order. A drive unit is controlled by the processor, performing a recording operation to record the data blocks to the optical disc according to the disc write task; wherein the processor further controls the drive unit to verify the recorded data blocks after completing the recording operation.

The processor determines a distance between current location of the pickup head and a start address of a next data block. If the distance exceeds a threshold level, the drive unit performs track seeking to move the pickup head to the start address of the next data block, and if the distance is below the threshold level, the drive unit performs track following to move the pickup head to the start address of the next data block. Yet, if the start address of the next data block is adjacent to the current location of the pickup head, the drive unit directly locks onto the start address of the next data block.

The processor may further trigger an error handling procedure upon finding an erroneously recorded data block during verification of the recorded data blocks. A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
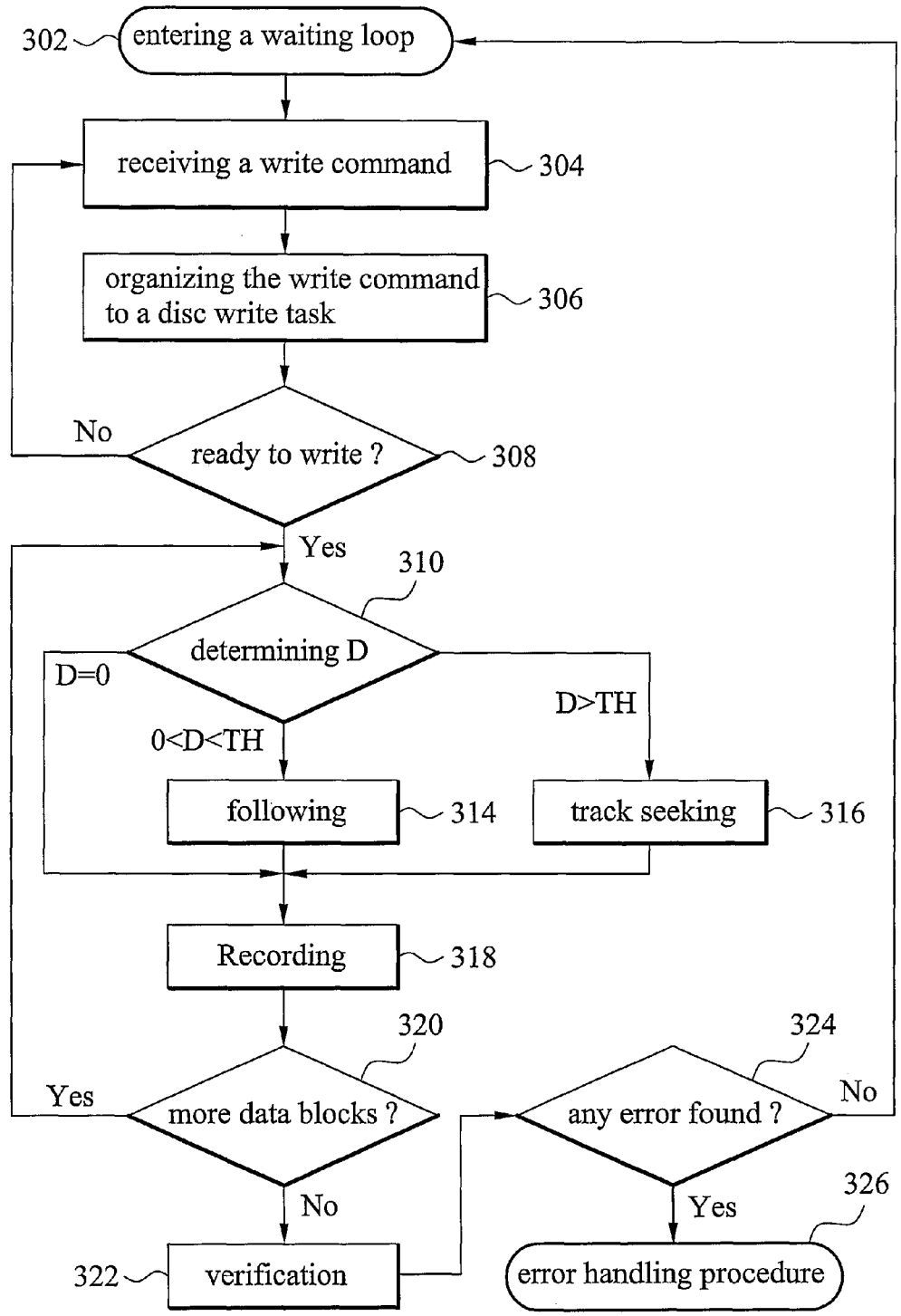
FIG. 3 is a flowchart of a random access control method according to an embodiment of the invention.

FIG. 3 is a flowchart of a random access control method according to an embodiment of the invention. A recording operation which successively record at least one data block #$W_D$ onto consecutive destination area of the optical disc is defined as a disc write task. To minimize the track seeking operation and to maximize performance of a recording operation, the processor 122 collects unrecorded data blocks having consecutive destination addresses and successively records those collected data blocks onto the optical disc in a disc write task. In consequence, the recorded data blocks of a write task are recorded in a segment of the optical disc. In the embodiment, processor 122 optimizes the received requests which sent from the host 110 and may have non-consecutive destination addresses to reduce unnecessary mechanical movement, i.e. track seeking And furthermore, the verification process is also improved by verifying multiple segments in a batch. In step 302, the optical disc drive 120 enters a waiting loop to await commands issued from the host 110. In step 304, a write command #$W_C$, including a data block #$W_D$ and a destination address is received by the optical disc drive 120. The destination address could be a logical address or a physical address. The data block #$W_D$ is also buffered into the buffer 124. In the embodiment, the data block #$W_D$ may not instantly be recorded to the optical disc until a specific condition is met. As an example of the specific condition, a physical recording process may be triggered when one or more ECC blocks are organized from the data blocks #$W_D$ or the buffered data blocks are buffered over a predetermined period of time. In step 306, the write command #$W_C$ is organized to a disc write task. Because of the received data blocks #$W_D$ may not have consecutive destination addresses, the buffered data blocks #$W_D$ may respectively organized into various disc write tasks. The disc write tasks are sorted by their destination addresses in monotonic incremental order or in decrement order. In other words, the destination addresses of the disc write tasks may not be necessarily continuous, but can be sequentially accessed thereby the pickup head will not randomly jumping back and forth. In step 308, the processor 122 may determine whether the buffer 124 gathers sufficient data block #$W_D$ to trigger the physical recording process. If the physical recording process is not yet ready, the process returns to step 304 to receive more write commands #$W_C$.

When the physical recording process is initialized, the unrecorded data blocks #$W_D$ are recorded onto the optical disc task by task. When the pickup head finishes recording a data block #$W_D$, it is located at the end address of the currently recording data block #$W_D$. The next data block #$W_{D+1}$ to be recorded, however, may not be necessarily consecutive to the current recording data block #$W_D$. As described, since the addresses of the disc write tasks are sorted in monotonic incremental order or in decrement order, the pickup head follows the disc rotation forwardly, so jumping back is never required. In step 310, distance between the current location of the pickup head and a destination address for next task is measured. If the next data block #$W_{D+1}$ is successive to the currently recorded data block #$W_D$ (D=0), its starting address of the destination address is just adjacent to the current location of pickup head. In this case, the procedure jumps to step 318, in which the drive unit 126 seamlessly records the data block #$W_{D+1}$ without track seeking.

Alternatively, if the next data block #$W_{D+1}$ is not successive to the currently recorded data block #$W_D$, but the distance is lower than a threshold level (0<D<TH), the drive unit 126 drives the pickup head by a following action to locate the starting address of the next data block #$W_{D+1}$ in step 314. Since the optical disc is constantly rotating, the location of the pickup head continuously varies no matter what operation is being performed. The following action is referred to as a short distance sliding action, allowing the pickup head to offset to the starting address of the next data block #$W_{D+1}$. Because no additional mechanical control is required to perform a following action, the performance remains as good as the continuous recording action. In addition, the following action is typically adaptable for the data blocks #$W_{D+1}$ discretely distributed within a short distance. Yet alternatively, if the distance determined exceeds the threshold level (D>TH), step 316 is executed, performing conventional track seeking to locate the destination address of the next data blocks #$W_{D+1}$. Step 316 is particularly relevant when the next data block #$W_{D+1}$ is located on the optical disc with a quit long distance from the current recording data block #$W_D$. Steps 314 and 316 are followed by step 318, whereby the next data block #$W_{D+1}$ is recorded to the destination address.

The recording process is recursively executed until the end of the disc write task. In step 320, the processor 122 checks whether a next disc write task is available. If so, the process returns to step 310, otherwise, a verification process is performed in step 322 to generate a verification result. In step 324, the processor 122 checks whether an error occurs. If so, step 326 is executed to trigger an error handling procedure such as an error correction or a re-queuing of the erroneous data block #$W_D$. If no error is detected, the process returns to step 302.

Figure 1:
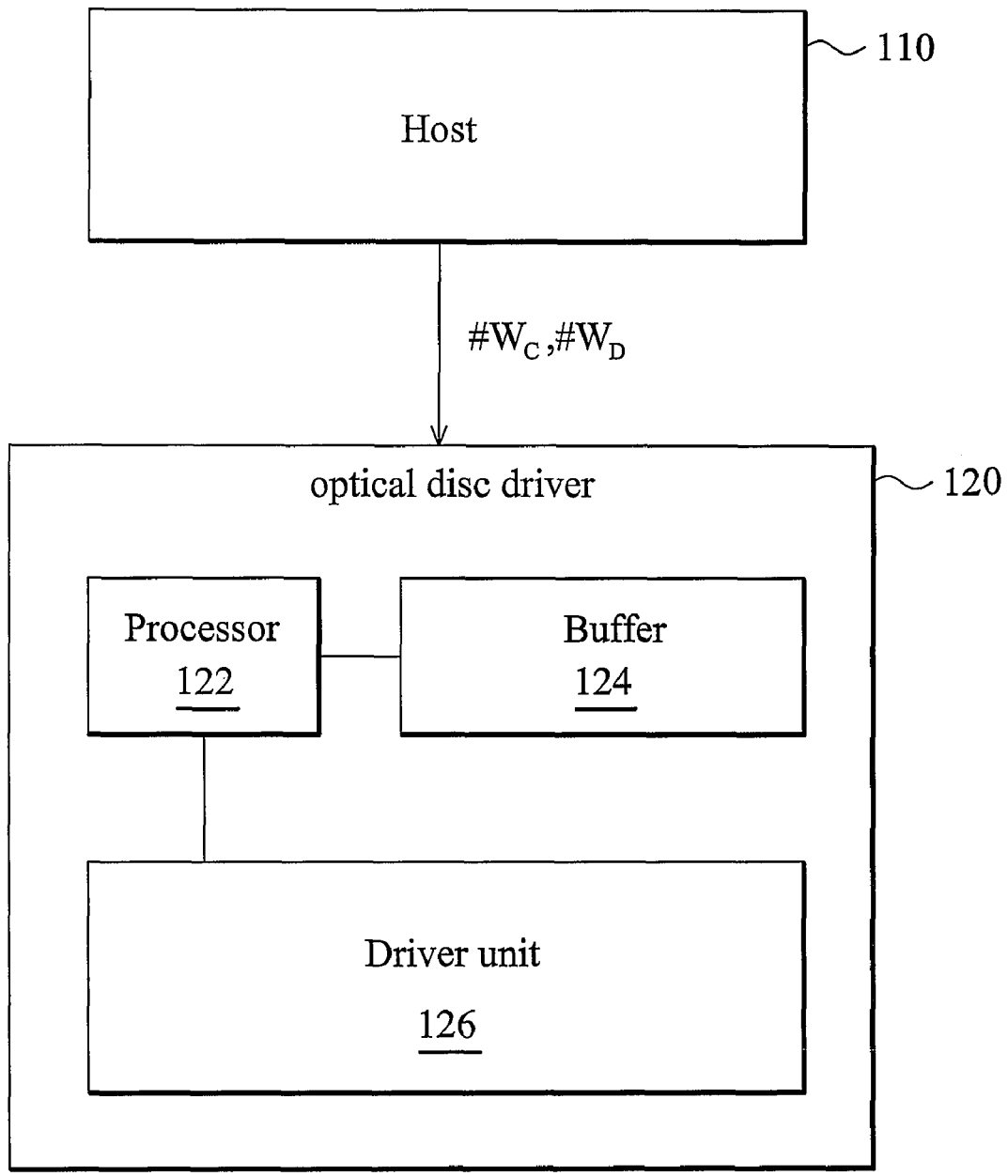
FIG. 1 is a simplified block diagram showing an optical disc drive coupled to a host.
Figure 2:
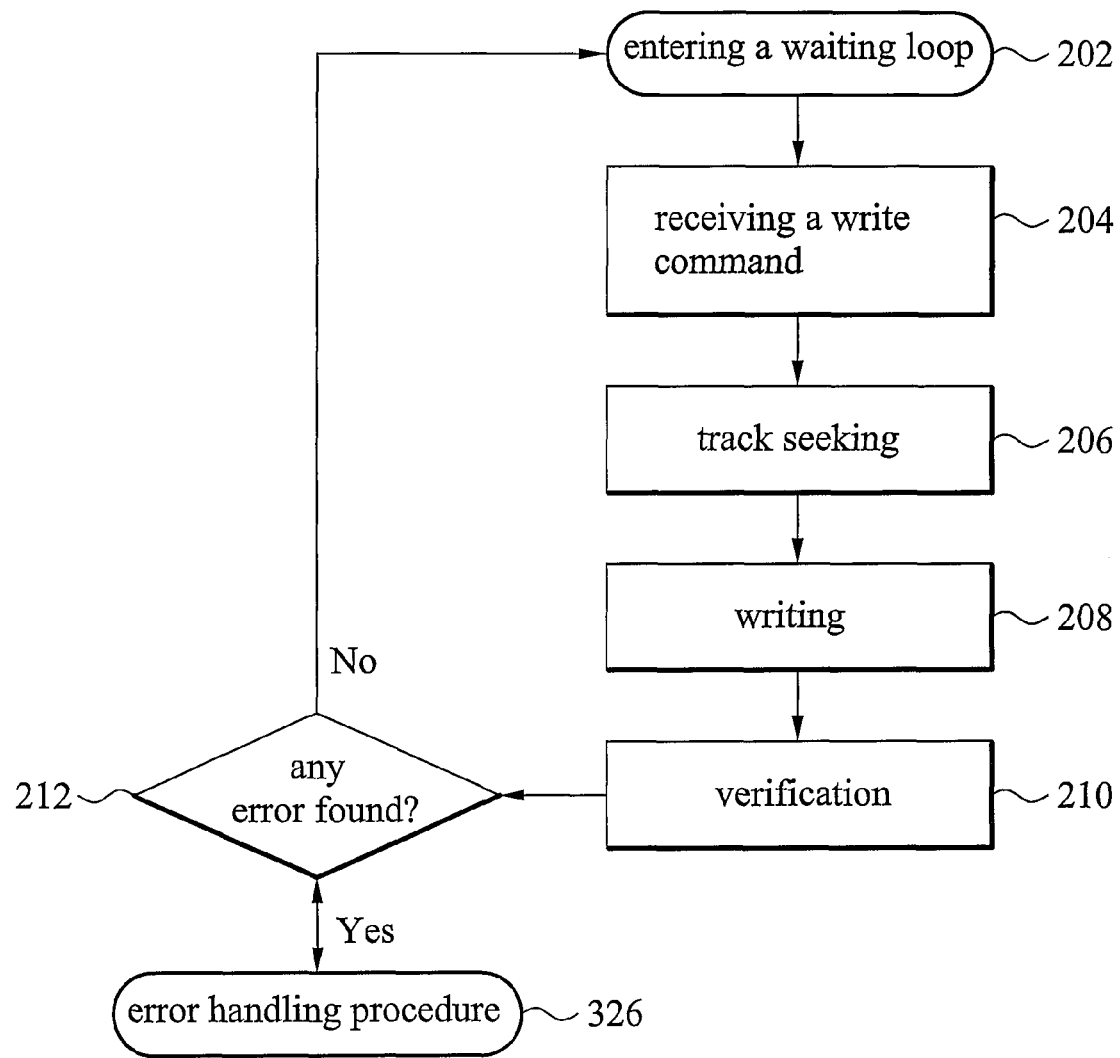
FIG. 2 is a flowchart of a conventional random access control method.
Figure 4:
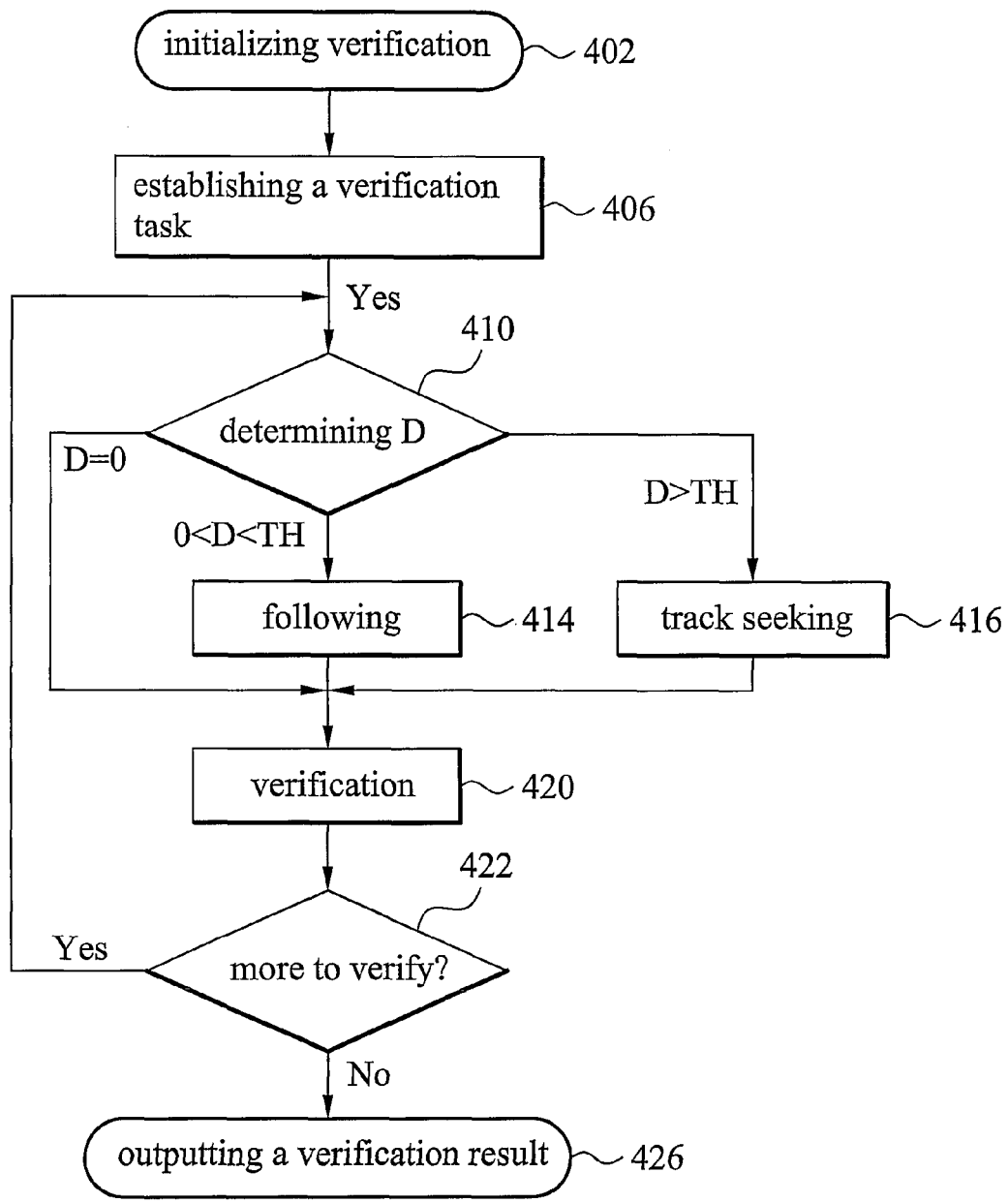
FIG. 4 is a flowchart of a verification process according to an embodiment of the invention.

FIG. 4 is a flowchart of a verification process according to an embodiment of the invention. During the conventional recording process in FIG. 2, every data block #$W_D$ is instantly verified right after being recorded. In the embodiment, verification is also optimized according to the disc write task. In step 402, a verification subroutine is initialized in step 322. The disc write task is used as a basis for verification. Additional data blocks #$W_D$ may also be required for verification while the host 110 issues a request. Thus, in step 406, the disc write task is utilized as a verification task, or alternatively, the verification task may be established according to the disc write task and the additional requests, in which the verification tasks are sorted by their addresses in monotonic incremental order or in decrement order. A recursive verification process is performed task by task. In step 410, distance between the current location of the pickup head and a destination address is measured. If the distance is zero, the process directly goes to step 420 to perform the verification. If the distance is lower than a threshold level but not zero, the pickup head is moved by a following action in step 414 to locate the destination address. In step 416, if the distance exceeds the threshold level, track seeking is performed to locate the destination address. Steps 414 and 416 are followed by step 420, in which verification is performed when the pickup head locates the destination address. In step 422, it is determined whether a next verification task is available. If not, a verification result is output in step 426. Otherwise, the process returns to step 410 for further verification. Meanwhile, the verification result may comprise an error list indicating one or more errors detected during the recursive verification process, and the error handling procedure triggered in step 326 of FIG. 3 may also be optimized by sorting the addresses therein. In the embodiments, mechanical movement of the pickup head can be efficiently reduced.

The disclosed method is particularly adaptable for rewritable optical disc drives, such as a Blue-Ray drive or DVD-RAM drive. The basic unit for a data block #$W_D$ may be a sector, and the verification process may use a Reed Solomon error correction coding (ECC) algorithm to detect the errors. The random access control method may be used not only in recording but also reading an optical disc, whereby mechanical movement of the pickup head is efficiently reduced. While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for recording data to an optical disc, comprising:
   buffering a plurality of write commands in a buffer, wherein each write command comprises a data block and a destination address;
   generating a disc write task according to the destination address of the data blocks buffered in the buffer, wherein the disc write task indicates a recording order of the data blocks; and
   performing a recording operation to record the data blocks to the optical disc according to the disc write task.

2. The method as claimed in claim 1, wherein the recording operation comprises:
   moving a pickup head to a location of the optical disc associated with the destination address corresponding to the disc write task; and
   recording the corresponding data blocks to the optical disc through the pickup head; wherein:
   the moving of the pickup head comprises:
   determining a distance between a current location of the pickup head and a start address of a next data block;
   if the distance exceeds a threshold level, performing track seeking to move the pickup head to the start address of the next data block;
   if the distance is below the threshold level, performing track following to move the pickup head to the start address of the next data block; and
   if the start address of the next data block is adjacent to the current location of the pickup head directly locating the start address of the next data block.

3. An optical disc drive for recording data to an optical disc, comprising
   a buffer, buffering a plurality of write commands with data blocks each bound to a destination address;
   a processor controlling the buffer, generating a disc write task according to the destination address of the data blocks buffered in the buffer to indicate a recording order of the data blocks; and
   a drive unit, controlled by the processor, performing a recording operation to record the data blocks to the optical disc according to the disc write task.

4. The optical disc drive as claimed in claim 3, wherein:
   the drive unit comprises a pickup head for accessing the optical disc;
   the drive unit moves the pickup head to a location of the optical disc associated with the destination address corresponding to the disc write task; and
   when performing the recording operation, the drive unit records a data block to the optical disc when the pickup head is moved to a corresponding address.

5. The optical disc drive as claimed in claim 4, wherein:
   the processor determines a distance between a current location of the pickup head and a start address of a next data block;
   if the distance exceeds a threshold level, the drive unit performs track seeking to move the pickup head to the start address of the next data block;
   if the distance is below the threshold level, the drive unit performs track following to move the pickup head to the start address of the next data block; and
   if the start address of the next data block is adjacent to the current location of the pickup head, the drive unit skips the track seeking and following, and directly locks on the start address of the next data block.

6. A method for recording data to an optical disc, comprising
   buffering a plurality of data blocks each associated with a write command wherein the write command comprises a recording address;
   generating a first disc write task according to the write commands to indicate a first recording order of the data blocks based on the destination address of the data blocks buffered in the buffer;
   generating a second disc write task according to the write commands to indicate a second recording order of the data blocks based on the destination address of the data blocks buffered in the buffer; and
   performing a recording operation to record the data blocks to the optical disc according to the first disc write task and the second disc write task.

7. The method as claimed in claim 6, wherein the recording operation comprises:
   moving a pickup head to a first location associated to the destination address corresponding to the first disc write task;
   recording the corresponding data blocks of the first disc write task to the optical disc through the pickup head;
   moving the pickup head to a second location associated to the destination address corresponding to the second disc write task; and
   recording the corresponding data blocks of the second disc write task to the optical disc through the pickup head.

8. The method as claimed in claim 7, wherein the moving of the pickup head comprises:
   determining a distance between a current location of the pickup head and a start address of a next data block;
   if the distance exceeds a threshold level, performing track seeking to move the pickup head to the start address of the next data block;
   if the distance is below the threshold level, performing track following to move the pickup head to the start address of the next data block; and
   if the start address of the next data block is adjacent to the current location of the pickup head, skipping the track seeking and following, and directly locating the start address of the next data block.

9. The random access control method as claimed in claim 1, wherein the destination address of the data blocks in the recording order is in a monotonic incremental order or a decrement order.

10. The optical disc drive as claimed in claim 3, wherein the destination address of the data blocks in the recording order is in a monotonic incremental order or a decrement order.

11. The random access control method as claimed in claim 6, wherein the destination address of the data blocks in the first recording order and the second recording order are in a monotonic incremental order or a decrement order.

* * * * *